April 26, 1949.  J. T. LEONARD  2,468,674
VALVE APPARATUS
Filed March 22, 1944  3 Sheets-Sheet 1
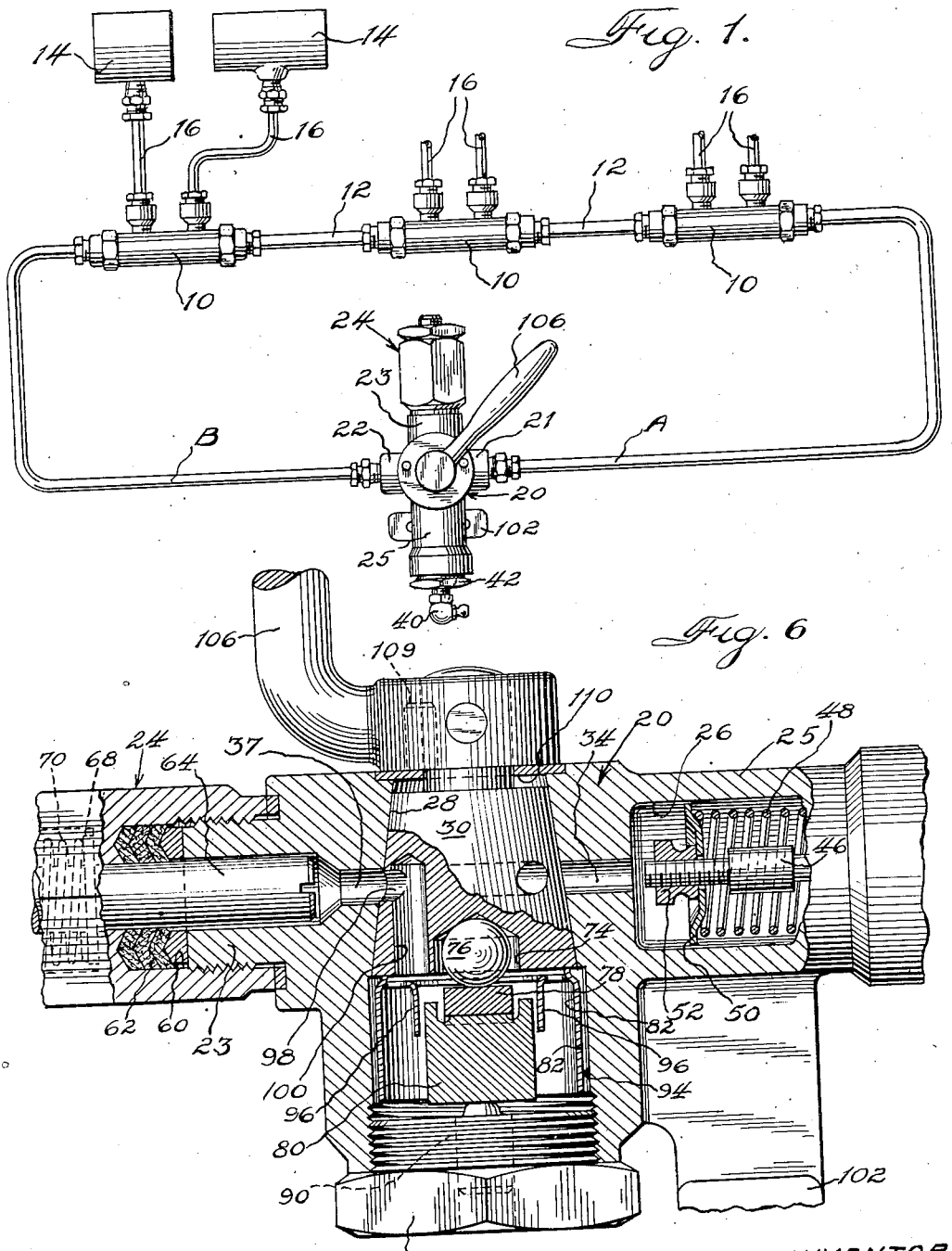
INVENTOR:
JOHN T. LEONARD
BY
Williams, Bradbury & Hinkle
ATTORNEYS.

April 26, 1949.	J. T. LEONARD	2,468,674
VALVE APPARATUS
Filed March 22, 1944	3 Sheets-Sheet 2
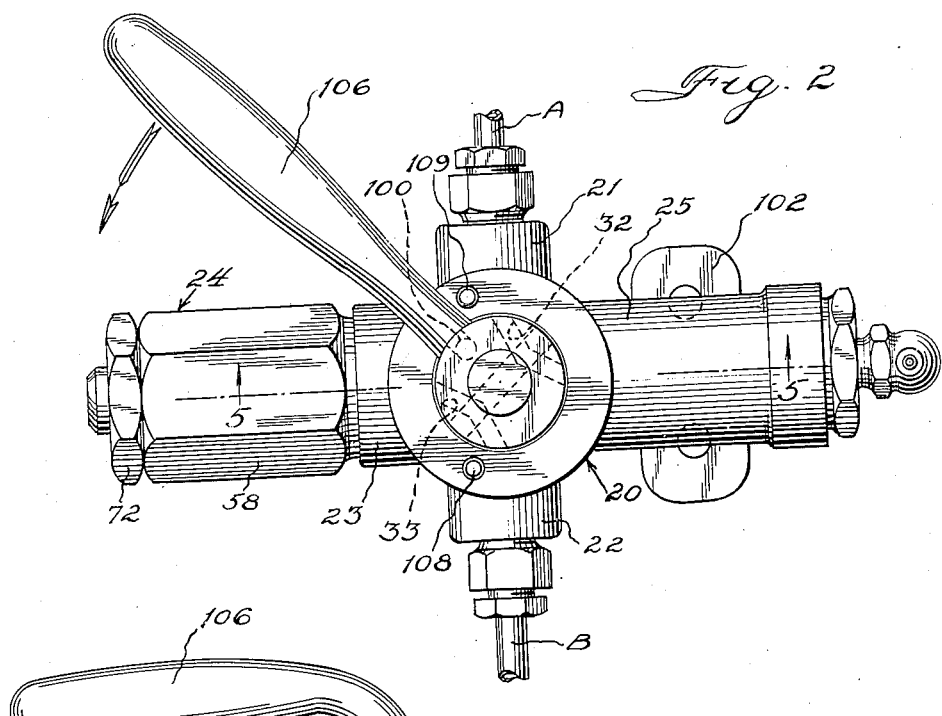
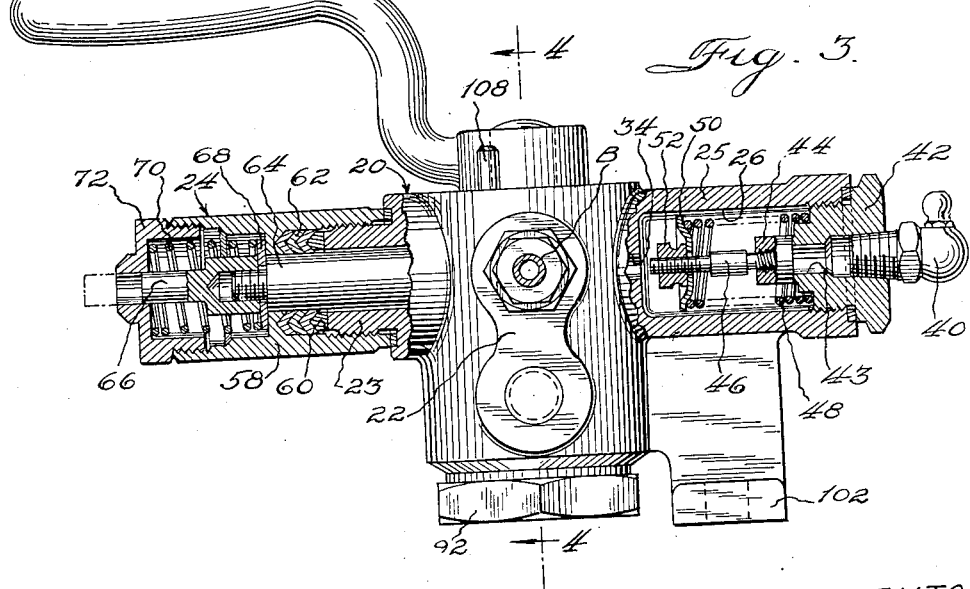
INVENTOR:
JOHN T. LEONARD
BY Williams, Bradbury & Hinkle
ATTORNEYS.

April 26, 1949.  J. T. LEONARD  2,468,674
VALVE APPARATUS
Filed March 22, 1944  3 Sheets-Sheet 3

INVENTOR:
JOHN T. LEONARD
BY Williams, Bradbury & Henkle
ATTORNEYS.

Patented Apr. 26, 1949

2,468,674

UNITED STATES PATENT OFFICE 2,468,674

VALVE APPARATUS

John T. Leonard, Evanston, Ill.

Application March 22, 1944, Serial No. 527,573

1 Claim. (Cl. 251—112)

My invention relates generally to valve apparatus, and more particularly to a four-way valve mechanism forming part of a reversible progressive type of centralized lubricating system.

It is an object of my invention to provide an improved lubricating system of the reversible progressive type having a simple and effective manually operable control valve for alternately connecting the lubricant pressure source to the two ends of the conduit system leading to the reversible progressive measuring valves.

A further object is to provide an improved plug valve.

A further object is to provide an improved four-way valve incorporating as parts thereof a lubricant pressure indicator and a lubricant strainer.

Other objects will appear from the following description, reference being had to the accompanying drawings, in which Fig. 1 is a plan view of a complete lubricating system for the lubrication of a plurality of bearings, utilizing reversible progressive measuring valves for apportioning the lubricant to the various bearings;

Fig. 2 is an enlarged plan view of the four-way reversing valve;

Fig. 3 is a front elevational view of the valve shown in Fig. 2, with portions of the valve body broken away to show the pressure indicator and the strainer;

Fig. 6 is a view similar to Fig. 5, showing the valve in displaced position.

Figure 4:
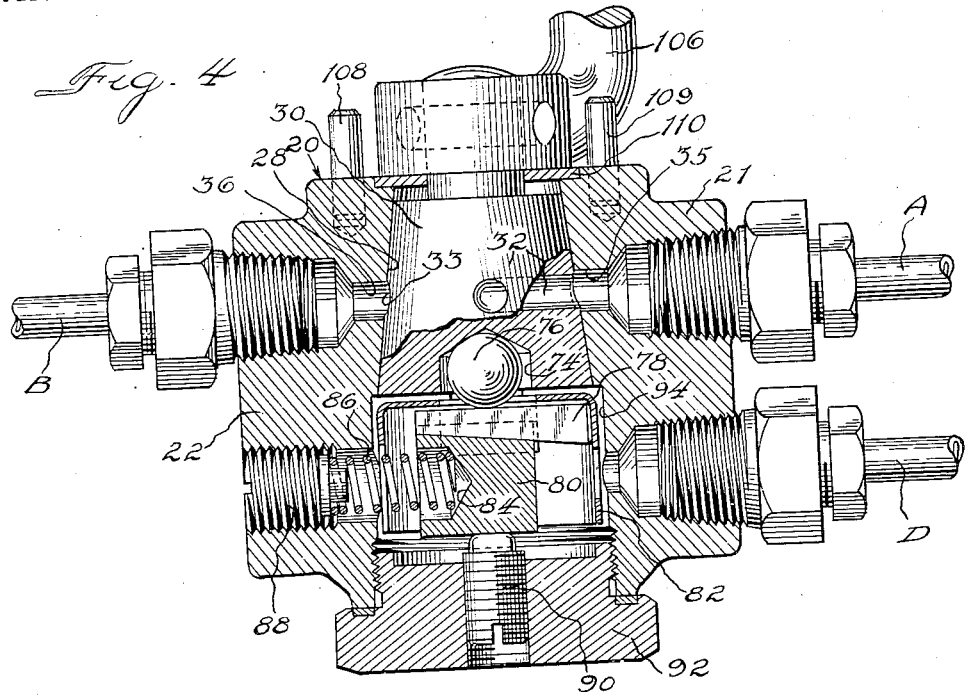
Fig. 4 is a sectional view taken on the line 4—4 of Fig. 3.
Figure 5:
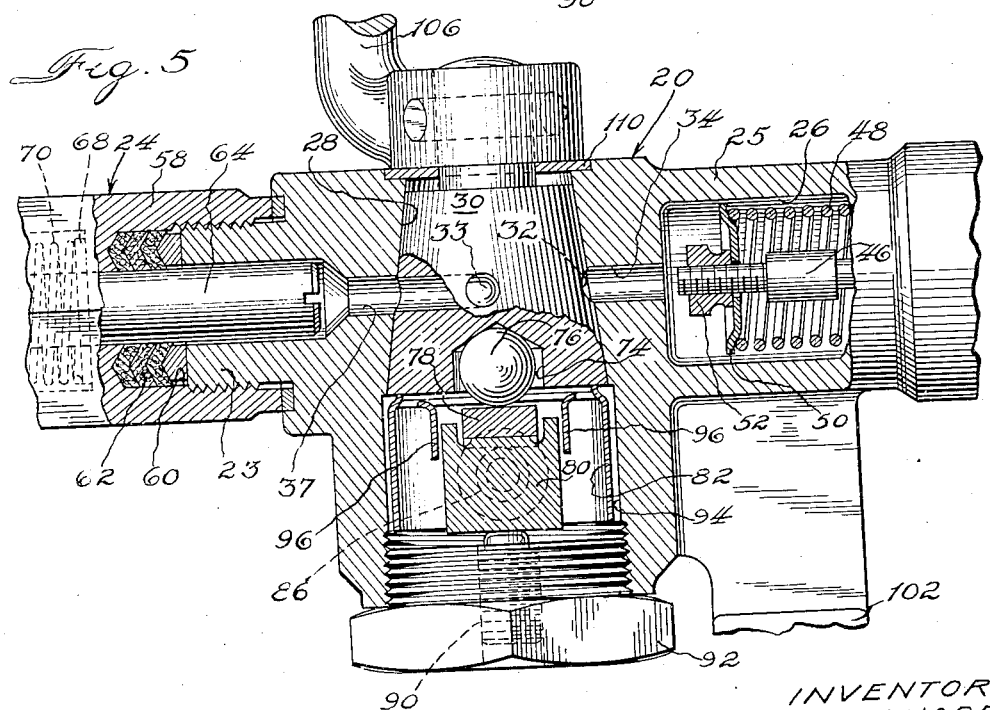
Fig. 5 is a transverse sectional view taken on the line 5—5 of Fig. 2.

In the centralized lubricating system shown in Fig. 1, there are illustrated a plurality of measuring valves 10 representative of any suitable number connected in series by means of a conduit A, conduit sections 12, and a conduit B. Each of the measuring valves 10 is adapted to supply lubricant to bearings 14 through feeder tubes 16. These may be of any suitable construction, such as disclosed, for example, in my prior Patent No. 2,115,637.

In the operation of valves of this type, it is necessary alternately to supply lubricant under pressure to the conduits at the end of the series of the valves, such as the conduits A and B.

The novel valve mechanism disclosed herein for accomplishing this purpose is illustrated as comprising a body 20 having bosses 21 and 22 for connection respectively with the conduits A and B, having a threaded boss 23 for attachment of a pressure indicator 24, and having an inlet boss 25 within which is located a strainer chamber 26. The boss 21 is also tapped for making connection with a conduit D, which may be led to a suitable sump, or may be utilized for the lubrication of a bearing located in the vicinity of the four-way control valve.

The body 20 has a tapered bore 28 for the reception of a complementally tapered plug valve 30. The plug valve 30 has a pair of passageways 32, 33 extending therethrough, the ends of these passageways being spaced at 90° intervals. Thus, when the plug valve is in the position in which it is shown in Fig. 2, the passageway 32 connects a port 34 with a port 35, while the passageway 33 connects a port 36 with a port 37. All of these ports are formed in the tapered bore 28. The port 34 communicates with a strainer chamber 26 formed in the boss 25, and as best shown in Fig. 3, the lubricant pressure is adapted to be supplied to this chamber 26 through a high pressure lubricant receiving fitting 40 which is threaded in a bushing 42, while the latter bushing is threaded in the end of the boss 25.

The bushing 42 has a passageway 43 extending therethrough and is provided with an inwardly extending portion 44 to which a stud 46 is threaded. A closely wound compression coil spring 48 has one end seating against the bushing 42 and its other end held by a suitable spring seat washer 50, the position of which may be adjusted by means of a nut 52 threaded on the stud 46. By proper adjustment of the nut 52, the spacing of the turns of the coil spring 48 may be varied to any desired extent so that the spring forms a screen to prevent particles of foreign matter above a predetermined size, from passing into the space surrounding the spring.

Threaded on the boss 23 is a pressure indicator body 58 which has a bore 60 for receiving annular V packing 62 through which a plunger 64 is slidable. The plunger has an indicating pin 66 threaded thereto, this pin being utilized to clamp a washer 68 against the end of the plunger 64. A loaded coil spring 70 is compressed between the washer 68 and an apertured cap 72, which is threaded in the body 58. Thus, the preloaded spring normally holds the plunger 64 in the position in which it is shown in full lines in Fig. 3, but upon application of a sufficiently high lubricant pressure, is moved outwardly against the force of the spring 70 to cause the pin 66 to project from the cap 72, as shown in dotted lines in Fig. 3, thereby to provide a visual and tactile signal showing completion of the lubricating operation, as will appear hereinafter.

The valve plug 30 has a recess 74 in its lower end for the reception of a hardened steel ball 76. A pair of complementary wedge blocks 78 and 80 are held in position by a stamped metal cage 82 so as to maintain the wedge block 78 in engagement with the ball 72. The wedge block 80 has a recess 84 for the reception of one end of a coil spring 86, the other end of which is seated against the inner end of a threaded adjustment plug 88. The wedge block 80 rests upon the inner end of a set screw 90, which is threaded in a cap 92, the latter being threaded in the lower end of the bore 28. By virtue of this construction the spring 86 tends continuously to urge the wedge block 80 toward the right (Fig. 4), and thereby to move the wedge block 78 upwardly, thus continuously applying an upwardly directed force to the valve plug 30. The bore 28 has a cylindrical enlargement 94 for reception of the cage 82 and the latter has downwardly bent flanges 96 for holding the wedge blocks 78 and 80 in position.

In addition to the cross passageways 32 and 33, the plug 30 has a port 98 communicating with a vertical passageway 100 leading into the cylindrical chamber 94.

In using the lubricating system, the control valve body 20 is bolted to a portion of the machine frame, or to any other convenient rigid support, by bolts passing through holes in a mounting bracket 102, which is formed integrally with the body casting 20. A handle 106 is pinned to the upper end of the plug valve 30 and is adapted to have its throw limited by a pair of stop pins 108 and 109. The upper end of the tapered bore 28 may have an annular recess therein for the reception of a sealing washer 110.

In using the lubricating system, a suitable source of lubricant under pressure, such as a motor operated portable lubricant compressor, is coupled to the fitting 40 and set in operation. Lubricant flowing through the fitting 40 is strained through the coil spring 48 to remove large foreign particles therefrom, and assuming that the valve handle 106 is in the position in which it is shown in Figs. 1 to 4, the lubricant in the screen chamber 26 will flow through port 34 and plug valve passageway 32 to the port 35, and hence through conduit A to the series of measuring valves 10. After sufficient lubricant has been supplied to operate all of these measuring valves, lubricant will commence flowing through the conduit B and through port 36 and plug valve passageway 33 to the port 37. As the pressure in the conduit B builds up, the plunger 64 will be forced outwardly, thus causing its end pin 66 to project from the cap 72 and thereby provide the operator with a signal showing that all of the measuring valves 10 have been operated.

It will be understood that when lubricant under pressure is supplied through the conduit A, lubricant will be discharged from each of the measuring valves 10 to only one of its associated bearings. In order to supply lubricant to the other bearings which are connected to the measuring valves 10, the operator swings the valve handle 106 counterclockwise from the position shown in Figs. 1 to 4. In the course of this movement of the valve plug, the port 98 will pass the port 37 and the spring 70 will force the plunger inwardly, ejecting lubricant through the port 98 and passageway 100 to the chamber 94, and hence through the conduit D to the drain or sump, or to an additional bearing requiring lubrication and which is connected to the conduit D.

Upon completion of the counterclockwise swinging movement of the handle 106, one end of the passageway 33 through the plug valve will be brought into registry with the port 34 so that lubricant may flow through this passageway to the port 36 and thence through the conduit B to the series of reversible progressive measuring valves 10. These valves will thus be operated in succession to supply measured charges of lubricant, each to the bearing connected thereto, which was not previously lubricated. After all of the measuring valves 10 have been operated, lubricant under pressure will flow through the conduit A and thence through port 35 and passageway 33 to the port 37 leading to the pressure indicator. As this flow continues and the pressure builds up, the plunger 64 and parts carried thereby will be forced outwardly again to cause the pin 66 to project from the end of the cap 72 and thereby indicate to the operator that a complete lubricating cycle has been performed, and that all of the bearings associated with the measuring valves 10 have been lubricated.

As wear takes place on the tapered surface of the valve plug 30, as well as on the surface of the bore 28 which is contacted by the valve plug 30, the spring 86 will force the wedge block 80 to the right (Fig. 4), and through its inclined plane sliding contact with the wedge block 78 will force the latter upwardly against the ball 76, and thereby cause the valve plug 30 to seat more tightly in its tapered bore 28 than it would otherwise have done. The inclination of the cooperating surfaces of the wedge blocks 78 and 80 is of such small angle that downward pressure on the valve plug 30 tending to move it away from its conical seating surface 28 is not possible. The spring pressed wedge blocks thus serve at all times as a slack take-up mechanism to hold the valve plug 30 in intimate contact with its cooperating seating surface of the bore 28. After enough wear has taken place, such that the wedge blocks 78 and 80 are no longer capable of exerting a sufficient force on the valve plug 28 to maintain it in firm engagement with the conical portion of the bore 28, the slack take-up mechanism may be readjusted by pulling the wedge block 80 to the left (Fig. 4), and at the same time turning the adjusting screw 90 sufficiently to contact with the lower surface of the wedge block 80, so that the assembly will be reconditioned for possible additional wear between the surfaces of the valve plug 30 and the surface of the valve seat 28. By making the valve plug 28 of a metal or metal alloy, differing in physical properties from those of the valve body 20, these parts are, in effect, lapped together every time the valve is operated. Of course, no abrasives are used after the manufacture of the valve has been completed, but the friction between these parts, as enhanced by the multiplied force of the spring 86, causes these parts to burnish and polish one another so that a lubricant pressure tight seal is maintained. The valve assembly therefore has a very long useful life, and is kept tight against leakage around the valve plug.

While I have shown and described a particular embodiment of my invention, it will be apparent that numerous variations and modifications thereof may be made without departing from the underlying principles of the invention. I therefore desire, by the following claim, to include within the scope of my invention all such variations and modifications by which substantially the results of my invention may be obtained through the use of substantially the same or equivalent means.

I claim:

In a valve, the combination of a valve body having a tapering seat, a valve rotatable in said body and having a complementally tapered surface for engagement with said seat, and means to hold said valve in contact with said seat and to take up play resulting from wear of the engaging surfaces comprising an abutment supported by the valve body in spaced relation to the larger end of said valve, a ball axially engaging the larger end of said valve, a block having a face engaging said ball and an opposite face slightly inclined to a plane perpendicular to the axis of the valve, a wedge interposed between said block and the aforesaid abutment and contacting the inclined face of the block to apply pressure to the valve along the axis thereof, a cage around the block and engaging the wedge to guide the latter for rectilinear movement, and a spring mounted in said valve body and reacting against said wedge in a direction perpendicular to the valve axis, the angle of the wedge being less than the angle of friction, whereby pressure applied to the wedge along the valve axis will not shift the wedge in opposition to the spring in a direction to loosen the seating of the valve.

JOHN T. LEONARD.

REFERENCES CITED

The following references are of record in the file of this patent:

UNITED STATES PATENTS

| Number | Name | Date |
| --- | --- | --- |
| 1,219,866 | Prescott | Mar. 20, 1917 |
| 1,349,449 | Foster | Aug. 10, 1920 |
| 1,807,701 | Norton | June 2, 1931 |
| 1,932,322 | Nordstrom | Oct. 24, 1933 |
| 2,153,559 | Hendricks | Apr. 11, 1939 |
| 2,280,925 | Nordstrom | Apr. 28, 1942 |

FOREIGN PATENTS

| Number | Country | Date |
| --- | --- | --- |
| 194,642 | Germany | Jan. 28, 1908 |